United States Patent [19]

Fortune et al.

[11] Patent Number: 4,507,546
[45] Date of Patent: Mar. 26, 1985

[54] CONTROL CIRCUIT RESPONSIVE TO A COMPONENT'S VARYING RESISTANCE

[76] Inventors: William S. Fortune, 29866 Cuthbert St., Malibu, Calif. 90265; Wayne A. Murray, 13117 Sierra Hwy., Saugus, Calif. 91350

[21] Appl. No.: 471,173

[22] Filed: Mar. 1, 1983

[51] Int. Cl.³ .............................................. H05B 1/02
[52] U.S. Cl. ................... 219/497; 219/501; 219/483; 323/235
[58] Field of Search ............... 219/494, 501, 508, 509, 219/483, 486, 497, 499; 307/117, 39–41; 323/238, 235, 237

[56] References Cited

U.S. PATENT DOCUMENTS

| | | | |
|---|---|---|---|
| 3,789,190 | 1/1974 | Orosy et al. | 219/499 |
| 3,946,200 | 3/1976 | Juodikis | 219/499 |
| 4,002,882 | 1/1977 | McCutchen | 219/499 |

OTHER PUBLICATIONS

Design Engineering, "Simplify and Improve heat control by combining temperature sensor and heater", Electronic Design 22, 10/25/1979, by Scharlack.

Primary Examiner—M. H. Paschall
Attorney, Agent, or Firm—Daniel T. Anderson

[57] ABSTRACT

An electronic control circuit for controlling the power applied to an electronic component such as a heater element or an electric winding for a motor. This is effected by measuring variations of the resistance of the component caused by the power flow therethrough. In a preferred form, the circuit has two operational amplifiers, one of which is a voltage comparator and summing amplifier to sum various signals, one being representative of the resistance of the component, the other amplifier operating as a monostable multivibrator. The component, which may be an electric heater for energizing through a switch controlled by the second amplifier. The resistance measurement is effected during the inflection point of the applied AC voltage. The heater is then energized for a full wave of the AC input. During every inflection point the resistance measurement is updated. A modification of the circuit includes a second heater disposed closely adjacent to the object to be heated to serve as an anticipatory circuit. Only one of the heaters is controlled. Alternatively the second heater may be represented by a thermocouple. It is also feasible to utilize two heaters, each of which is controlled by a separate set of two operational amplifiers. Finally, the circuit may be modified to provide a digital readout.

12 Claims, 10 Drawing Figures

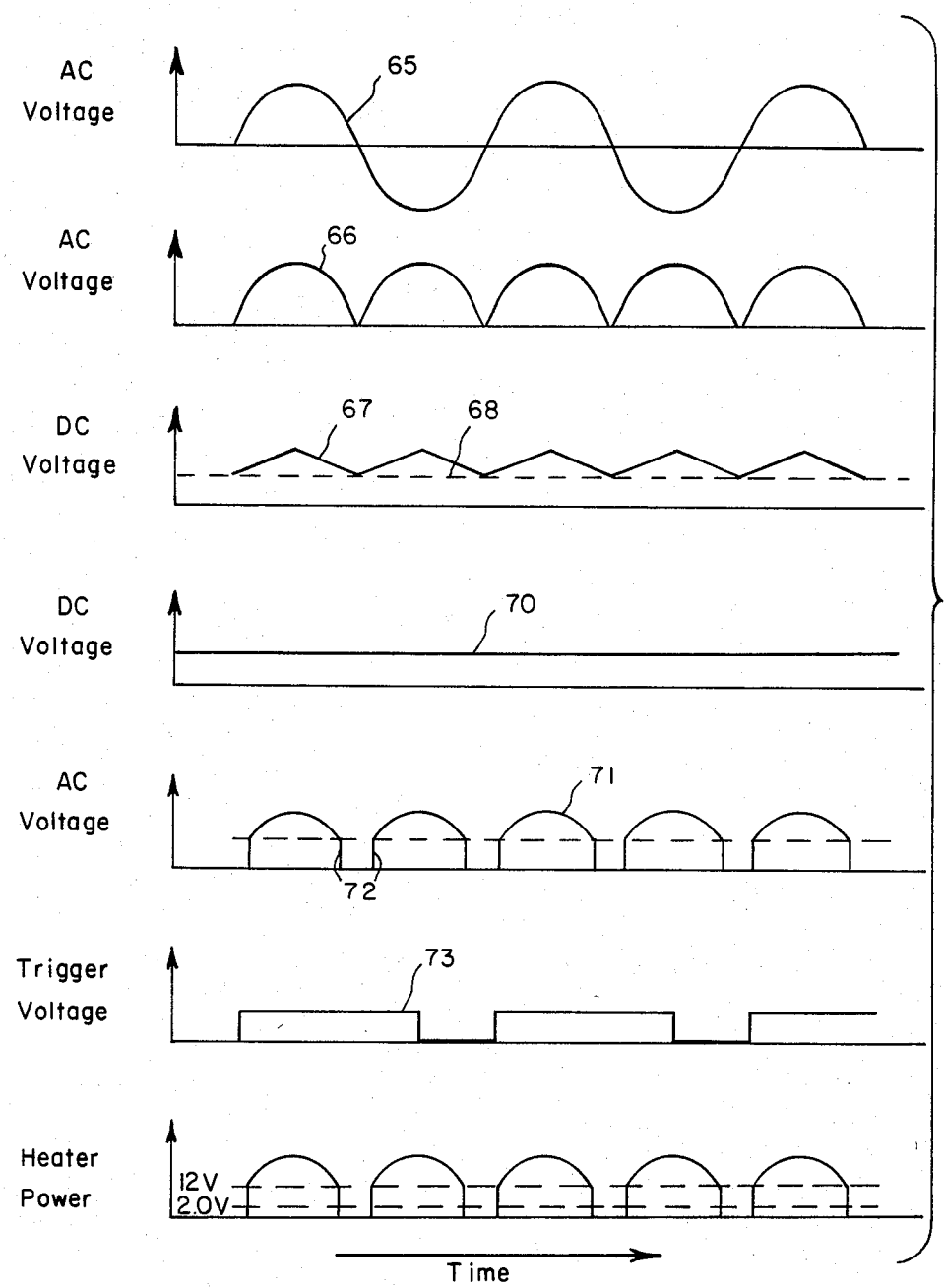
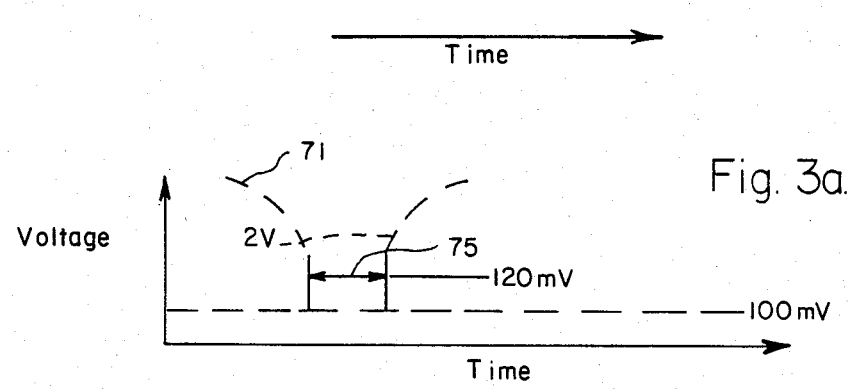
Fig. 3.
Fig. 3a.

CONTROL CIRCUIT RESPONSIVE TO A COMPONENT'S VARYING RESISTANCE

This invention relates generally to electronic control systems, and particularly relates to a circuit for controlling the power applied to an electronic component by measuring the variations of its resistance caused by the power flow therethrough.

The invention aims primarily to control the heat of the heater element, such as used, for example, in a soldering instrument. However, it will be understood that the control circuit of the invention is equally applicable for controlling other functions, such as the temperature of any heater, including an electric oven, the number of revolutions of an electric motor or alternator, or the temperature of a refrigerator, which may, for example, be cooled by a Peltier device. While these examples will be more fully discussed hereinafter, it is believed to be more instructive to explain first the invention in connection with its primary use.

In the past, it has been attempted to control the temperature of, say, the tip of a soldering instrument, by means of a temperature sensor. The sensor, in turn, is coupled to an electronic circuit which, in turn, aims to maintain the temperature of the heater element at the desired temperature. Such circuits have various problems, such, for example, that the temperature sensor itself may have a non-linear characteristic, or that its temmperature range may be limited, perhaps at the high temperature end or at the low temperature end, or at both.

Recently it has been proposed to make use of the resistance variations of the heater element due to variations of the current flowing therethrough. Such a circuit has been described by Ronald S. Scharlack in an article which appears in the "Design Engineering" section of *Electronic Design*, Vol. 22, Oct. 25, 1979, pp. 106–110.

The circuit proposed therein has various disadvantages. In the first place, it requires a large number of components because the illustrated circuit is only one-half of what is required. The circuit has simply been designed by stringing together subcircuits to accomplish the various functions which are needed. The circuit includes only a single operational amplifier having a relatively low sensitivity. Hence, the power levels throughout the circuit are relatively high.

A zero crossing circuit is obtained by a plurality of gates. Other gates are used for controlling the amplifier output and the triac which switches on and off the heater element. The triac, in turn, is controlled by a transformer. The resistance variations are sensed by a bridge circuit, two arms of which are formed by a voltage divider resistive network. The amplifier is connected to a fixed point of the two bridge arms, each of which may be varied by a set point and a trim, thereby to vary the balance of the bridge.

In accordance with the present invention, the temperature of an electric heater element, or any electrical component having a resistance varying with the power flowing therethrough, is controlled by a control circuit. The heater forms one arm of a bridge, while the second arm is formed by a resistor. A voltage divider with a variable tap forms the other two arms of the bridge. A zero crossing signal is obtained from the input alternating current wave by a combination of diode and transistor. The diode, in turn, is controlled by a sample-and-hold circuit responsive to a positive going sine wave only.

A first operational amplifier acts as a voltage comparator and summing amplifier. It has a gain in the millions. It will sum the zero crossing signal as well as voltage corresponding to a current flowing through the heater during the inflection point of the alternating current wave, indicative of the temperature. Furthermore, the input is responsive to a positive feedback which provides a hysteresis to reject unwanted signals which may be developed during the zero crossing period.

The first operational amplifier controls a second operational amplifier which has a relatively low gain. One of its input terminals is connected to a voltage divider, while the other one is connected to the output of the first amplifier. There is also a time constant circuit coupled to the second input of the second amplifier, so that the amplifier operates as a one-shot multivibrator; that is, as a monostable device. The time constant is such that it will insure that it will trigger the triac controlling the heater for a full wave of the input sircuit. In other words, the time constant is greater than one-half wave and less than a full wave.

The circuit may further be improved to give it an anticipatory action. To this end, a second heater may be provided, having a lower power than that of the first heater. The second heater may be disposed near the object to be controlled, such as the tip of a soldering instrument. Only the change of resistance of the second heater is measured to turn on both heaters in unison when the heater temperature is less than the set temperature.

Another improvement is provided by a circuit, again with two heaters, but each having a separate control circuit consisting of a pair of operational amplifiers. The positive feedback of the first operational amplifier of each of the two sets of amplifiers may be controlled to have a different hysteresis from that of the amplifier of the second set, to take care of variations of heat transfer between the first heater and the object to be controlled; that is, the tip of a soldering instrument. Such an arrangement will make it possible to use, for example, in a soldering instrument a soldering tip having a lower heat transfer. In other words, there is no necessity to utilize copper, which has a high heat conditivity but is easily affected by the solder and the acid in the flux. This is effected by simply controlling the positive feedback of each of the respective first operational amplifiers.

Finally, a circuit is disclosed which permits the digital display of the sensed temperature.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 3 is a diagram of a set of voltages plotted as a function of time, the voltages being representative of those at key portions of the circuit of FIG. 1;

FIG. 3a is a diagram, on enlarged time scale, of one of the voltages to illustrate in detail the circuit operation at the inflection point of the input alternating current;

FIGS. 5 and 6 show schematically the front portion and tip of a soldering instrument, FIG. 5 illustrating a second heater element embedded in the tip, while FIG. 6 illustrates the use of a temperature sensor in the tip of a soldering instrument;

DETAILED DESCRIPTION

Figure 1:
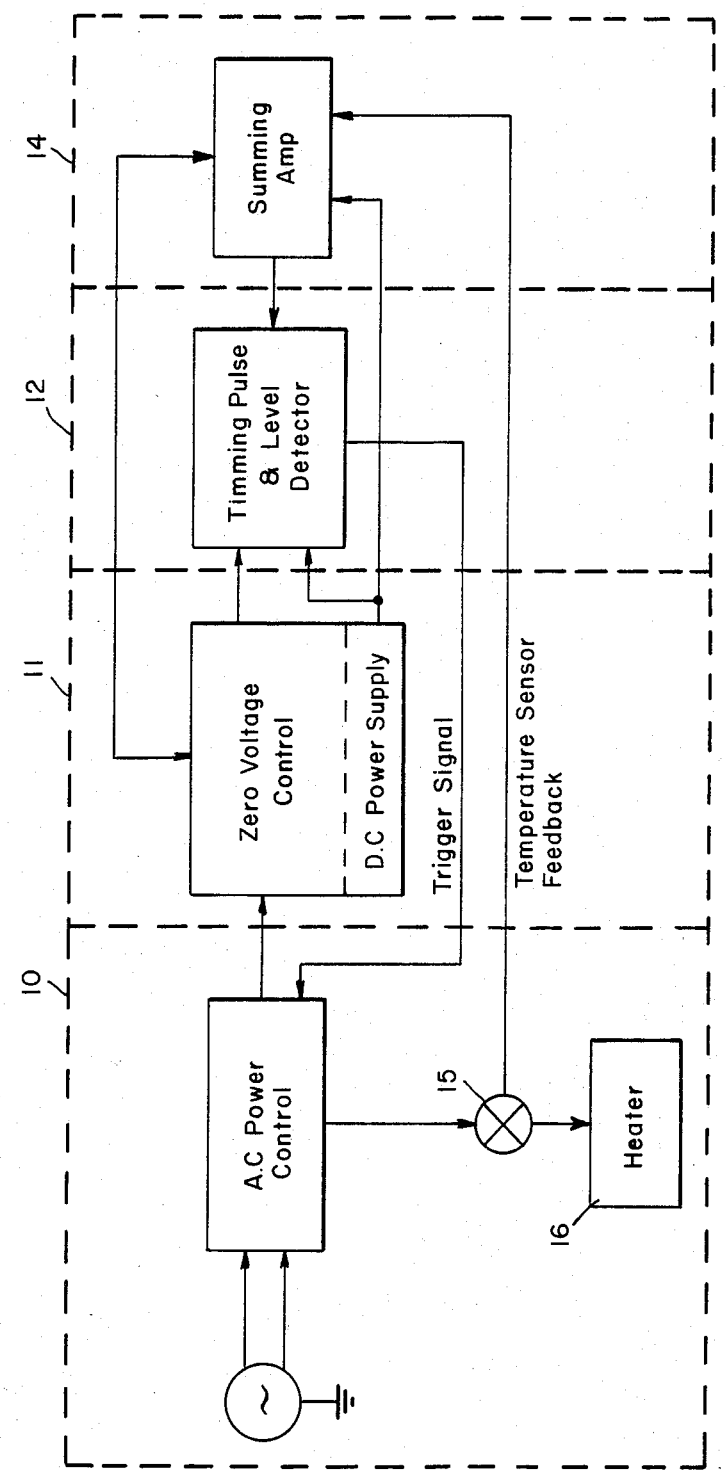
FIG. 1 is a block diagram showing schematically the operation of an electronic circuit embodying the present invention.

Referring now to the drawings and particularly to FIG. 1, there is shown in block form the control circuit of the present invention. The control circuit includes a section 10 which is the alternating current power control and heater section. It further includes a section 11 which provides a zero voltage control and DC power supply. This generates a zero crossing signal which is applied to section 12. Section 12 includes a timing pulse and level detector. This responds to the zero crossing signal and includes a level detector which may be called a voltage comparator. The last section is section 14 which includes a summing amplifier which references the zero crossing signal from section 11, as well as a signal from the heater corresponding to its resistance. It then controls the timing pulse, section 12, which generates a trigger signal going back to the alternating current power control and a switch 15 which controls the heater 16. It should be emphasized that the summing amplifier only responds when a zero crossing signal is present and when the sampled voltage from the heater 16 is less than, or more than (as the case may be) a predetermined reference voltage.

Figure 2:
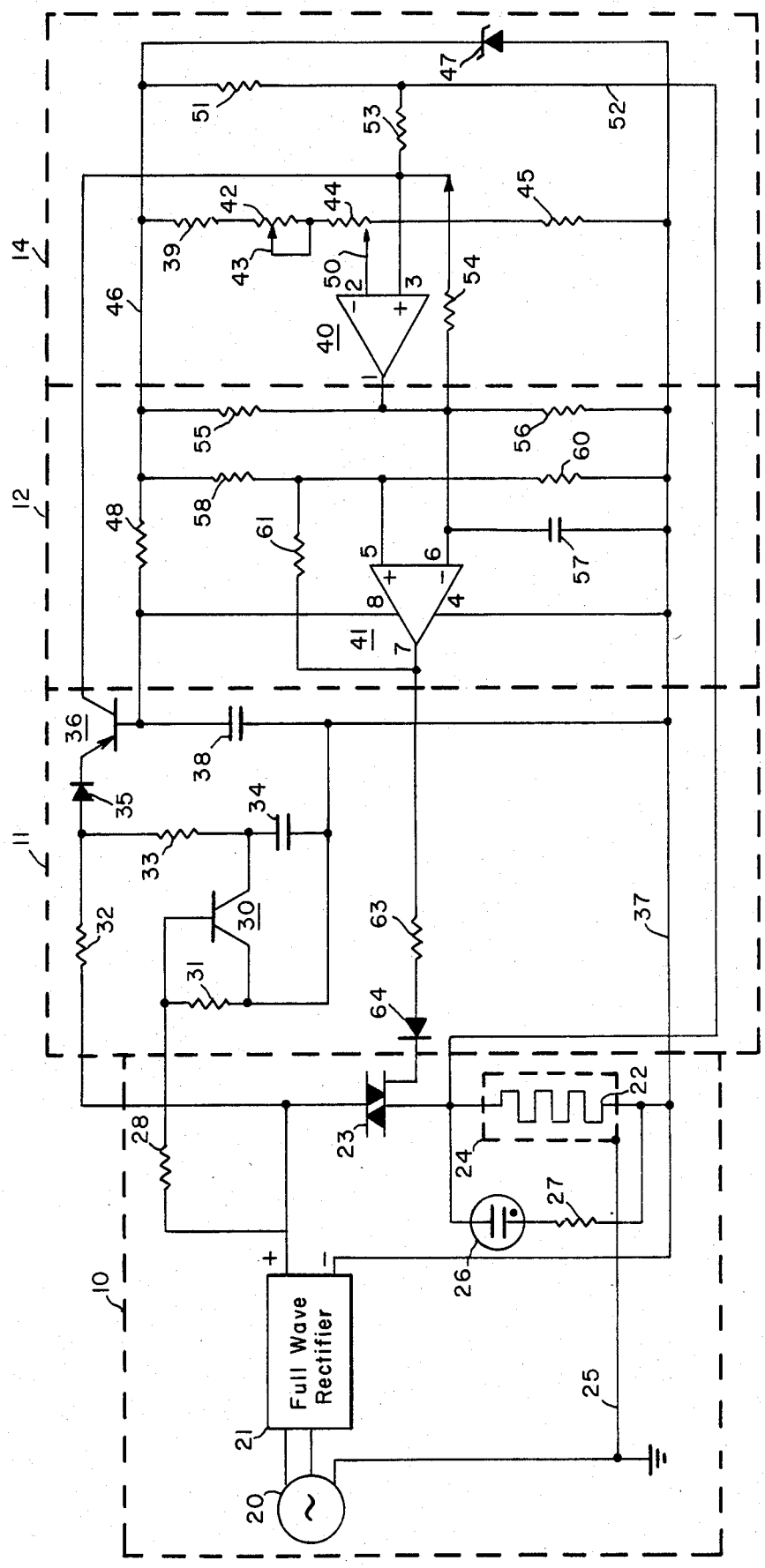
FIG. 2 is a detailed circuit diagram of one embodiment of one form of the invention, the circuit being subdivided into sections corresponding to those of FIG. 1.

Referring now to FIG. 2, this shows a detailed circuit diagram of what was shown in block form in FIG. 1. Thus, the circuit of FIG. 2 includes an AC voltage source 20 which feeds a full wave rectifier 21. The two outputs of the rectifier 21, labeled "+" and "−", are connected across a heater element 22 which is serially connected with a switch 23 which may, for example, be a triac. The heater 22 may be surrounded by a shield 24 to screen it. The shield 24 may be connected to a lead 25 connected, in turn, to the ground potential of the source 20. A light-emitting diode or neon lamp 26 and a resistor 27 are serially connected across the heater 22.

One of the outputs of the AC current source 20 is connected to a resistor 28 which, in turn, is connected to the base of a transistor 30. The emitter of transistor 30 is connected to its base through a resistor 31. The collector of transistor 30 is connected to the positive output of the rectifier 21 through a current-limiting resistor 32 and through another resistor 33, the two being connected in series to form a voltage divider. The emitter and collector of transistor 30 are interconnected by a capacitor 31.

The portion of the circuit just described forms a sample-and-hold circuit, as will be more fully explained hereinafter. The junction point of resistors 32 and 33 is connected to the anode of a diode 35, the cathode of which is connected to the emitter of transistor 36, being arranged as a switching transistor. The base of transistor 36 is connected to a common voltage line 37 through a capacitor 38. Capacitor 38 has the function to hold a voltage of +12 v, which corresponds to that of the base of transistor 36.

There are further provided two operational amplifiers 40 and 41 which are both operational amplifiers and the function of which will presently be explained. The amplifier 40 has two input terminals 2 and 3. A reference voltage is impressed on the input 2 by a voltage divider consisting of a resistor 39, a resistor 42, the value of which may be varied by a tap 43, a resistor 44, and a resistor 45. The entire voltage divider 41–45 is connected between a lead 46 which carries a voltage of +8 v held by a zener diode 47 through a current-limiting resistor 48 and the common voltage line 37. The input 2 of the amplifier 40 is connected to the resistor 44 through a variagle tap 50. It should be noted that a bridge circuit is formed having two arms consisting of resistors 39, 42, and the top portion of resistor 44 above the tap 50, the other arm being constituted by the bottom portion of resistor 44 below the tap 50 of the resistor 45. It will therefore be noted that the value of the two bridge arms is only varied when the variable tap 50 is moved to change the setting of the temperature. The variable tap 43, which varies the value of the resistor 42, is used for calibrating a potentiometer; that is, the two bridge arms.

The other two arms of the bridge consist of the heater 22 and a resistor 51. In other words, the two arms of the bridge consist of the resistor 51 between the lead 46 and a lead 52, which in turn is connected to the top of heater 22, the bottom of which is connected to the rectifier 21 through lead 37. Another current-limiting resistor 53 is connected between the lead 52 and input 3 of operational amplifier 40. Finally, a positive feedback resistor 54 is connected between the output 1 of the amplifier 40 and its input 3. This feedback resistor 54 sets a hysteresis level between the two outputs 2 and 3 of amplifier 40. This prevents the amplifier 40 from switching due to residual noise and undamped oscillations rather than in response to the desired control signal.

It will hence be seen that the amplifier 40 serves as a summing amplifier to add three different signals. The first signal is a zero crossing signal obtained from the collector of switching transistor 36. The second signal is obtained from lead 52. Thus, the signal is obtained from the current flowing through lead 52 and heater 22 back to the rectifier 21 when the alternating current is at the zero crossing level. The third signal is caused by the positive feedback resistor 54. The current-limiting resistor 53 prevents the AC current voltage from affecting the operation of the amplifier 40.

Resistors 55 and 56 provide a voltage dividing network and their junction is connected to the output 1 of amplifier 40.

The next operational amplifier 41 has its second input 6 connected to the output 1 of amplifier 40. It is also biased by the two resistors 55 and 56. A capacitor 57 is connected between the input 6 of amplifier 41 and the common voltage lead 37. As a result, resistors 55 and 56, together with capacitor 57, form a time-constant circuit for input terminal 6. This time-constant circuit 55, 56, 57, controls the length of conduction of the heater 22, as will subsequently be explained. It should have a time period of more than one-half wave of the input wave and less than a full wave thereof. By way of example, it may have a time constant of 1.5 time one-half cycle of the input wave. It thus forms a one-shot multivibrator; that is, a multivibrator having one stable state.

The input terminal 5 of the amplifier 41 is biased by another voltage divider network consisting of resistors 58 and 60, connected in series between leads 46 and 37. A feedback resistor 61 is connected between input 5 and output 7 of the amplifier 41. In other words, the voltage level at input terminal 5 of amplifier 41 set by resistors 58, 60 must be exceeded by the voltage at the input terminal 6 to switch the amplifier 41. The bias voltage on input terminal 5 is such that it will avoid switching of the amplifier from spurious noise of the output from amplifier 40.

The circuit of FIG. 2 operates in the following manner: Transistor 36 and diode 35 provide a communicative function. The two components generate a control signal at the zero crossing or inflection point of the input wave. This, in turn, will switch power on or off to the power supply capacitor 32. The sample-and-hold transistor 30 and capacitor 34 clamp only on a positive going sine wave. This is effected by sampling the applied voltage input through resistor 28. Hence, this combination operates as a sample-and-hold circuit. The clamping action of transistor 30 causes the emitter of switching transistor 36 to go low, which turns off the transistor. This results in a zero crossing voltage signal through the collector of switching transistor 36 only when the input sine wave is going positive. The convention is such that a zero voltage at the collector of resistor 36 is true, while a plus voltage at the collector is false because the sine wave is not at zero.

When the input sine wave goes negative, transistor 30 unclamps. This allows the RC time constant circuit of resistor 33 and capacitor 34 to increase in voltage. This, in turn, holds the emitter of switching transistor 36 high and, of course, inhibits the transistor from switching. Hence, the positive zero crossing voltage signal is inhibited. This allows the amplifier 40 to measure the heater resistance because the triac 23 is open.

It will now be seen that the triac 23 can only be switched on at the beginning of a positive going sine wave.

As previously explained, the input terminal 2 of amplifier 40 has a reference voltage applied to it by the variable tap or slider 50. The three voltages applied to input terminal 3 of amplifier 40 must be high; that is, larger than that of input terminal 2, to turn off the amplifier.

The three voltage signals are again the voltage at the collector of transistor 36, which is high unless it is a zero crossing voltage. The second voltage applied to input terminal 3 of amplifier 40 is that of the two legs of the bridge; that is, heater 22 and resistor 51. The third input signal is a positive feedback of resistor 54.

If the voltage applied by lead 52 is greater than the reference voltage at input terminal 2 of amplifier 40, the output voltage at input terminal 1 of amplifier 40 goes high. This, in turn, causes the output at output terminal 7 of amplifier 41 to go low, which means that no trigger pulse is applied to the triac 23. However, if the voltage applied by lead 52 is less than the reference voltage at input terminal 2 of amplifier 40, the output at output terminal 1 of amplifier 40 goes low. This, in turn, causes the output 7 of amplifier 41 to go high. This will turn on triac 23 through a currentlimiting resistor 63 and a diode 64. The diode 64 serves the purpose to prevent the AC voltage from flowing back toward amplifier 41.

The light-emitting diode 26 serves the purpose to indicate the duty cycle of the heater 22 and is, of course, optional.

It should be noted that the circuit of FIG. 2 has two direct current voltages, namely a 12 v DC voltage established at the emitter-base of transistor 36 and a lower 8 v voltage established by the voltage-dropping resistor 48 and zener diode 47.

Referring now to FIGS. 3 and 3a, there are illustrated charts of the voltages appearing at various points of the circuit of FIG. 2 as a function of time. Curve 65 is, of course, the alternating current input voltage. Voltage curve 66 is a fully rectified voltage which appears at the output of rectifier 21. Curve 67 represents the direct current voltage shown at 68 with an alternating current ripple which appears at the input of diode 35. The DC voltage 70 appears on lead 46; that is, the 8 v DC voltage. Curve 68 shows the DC voltage of 12 v which appears at the base of transistor 36.

Voltage curve 71 is the AC voltage which appears at the collector of switching transistor 36. It is an inhibit voltage above 12 v, but it senses the heater resistance below 12 v, as shown at 72. The result of this action is a trigger voltage 73 which appears at the output of amplifier 41. This voltage pulse has a length of approximately three-fourths of a cycle to insure that the heater 22 will receive power through an entire cycle. The resulting heater power which flows through heater 22 is shown at 74. It is basically like a full wave rectified wave which starts at a level of 12 v and stops at a 2 v level.

FIG. 3a shows a voltage on an expanded time scale which appears at the input terminal 3 of the amplifier 40. Here the voltage wave 71 begins to drop vertically down at a 2 v level until it reaches 100 mv, while the reference level is 120 mv. The arrow 75 represents a time period of 150 microseconds.

Figure 4:
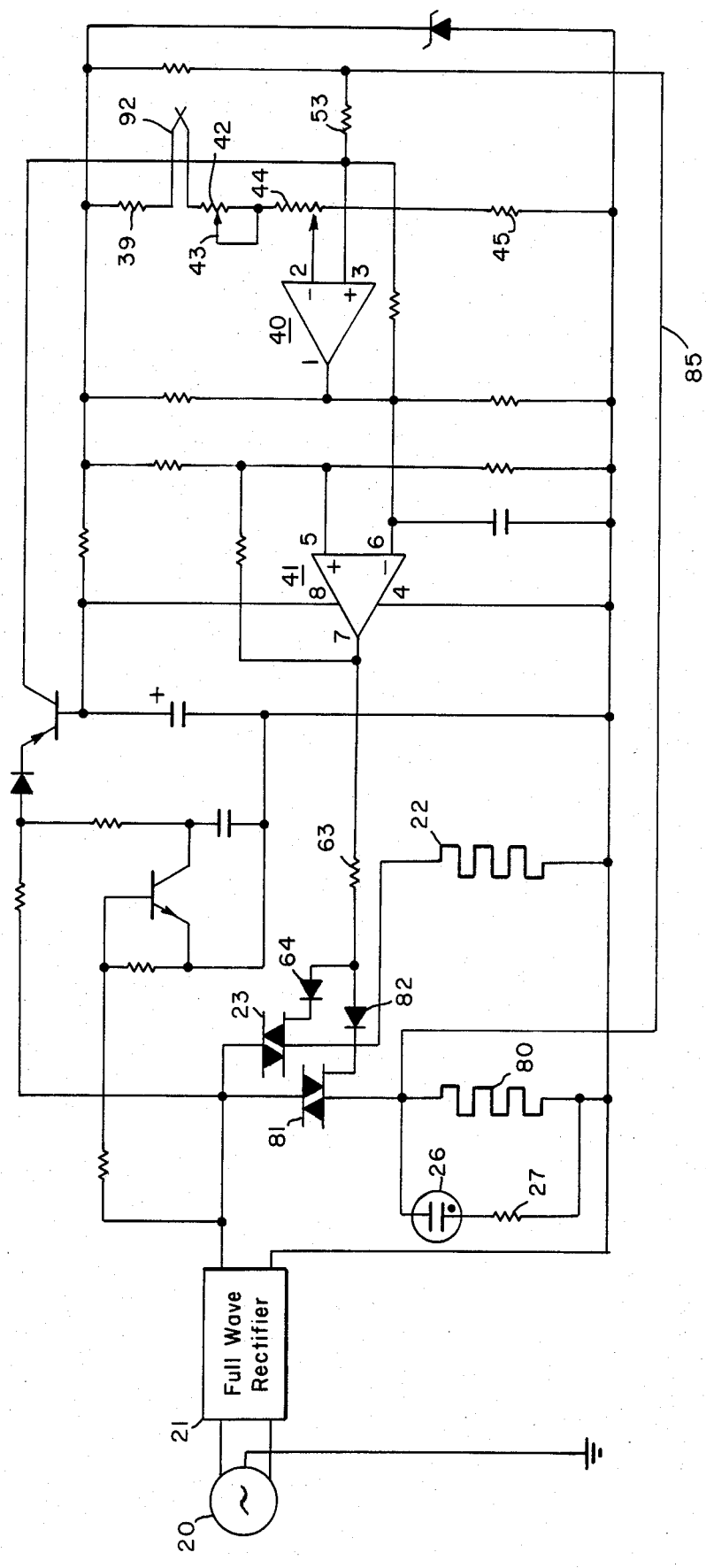
FIG. 4 is a circuit diagram generally similar to that of FIG. 2 but illustrating the use of a second heater element of lower power for controlling both itself and the first heater element of high power, the circuit also showing an alternative temperature sensor which may be used instead of the second heater element.

Referring now to the circuit of FIG. 4, it will be noted that this provides an anticipatory action. To this end, a second heater 80 is provided which basically is arranged parallel to the first heater 22. By way of example, the first heater 22 may have a power capacity of 70 watts, while the second heater 80 may have a capacity of only 20 watts. The heater 80 is controlled by a triac 81 which, again, operates as a switch and is controlled by a rectifier 82.

The circuit of FIG. 4 operates in the same manner as does that of FIG. 2. The resistance of the smaller heater 80 has 3.5 times more resistance, thus 3.5 times the sensitivity. Only this resistance is measured by a lead 85 which feeds to the input terminal 3 of amplifier 40. The resistance of the heater 22 is not measured. Hence, when the resistance of the heater 80 changes beyond a set level, a signal will be applied by lead 85 and current-limiting resistor 53 to the input terminal 3 of amplifier 40. This, in turn, will control both triacs 23 and 81 in unison through their respective diodes 64 and 82, in response to the output of amplifier 41, as previously described.

Figure 5:
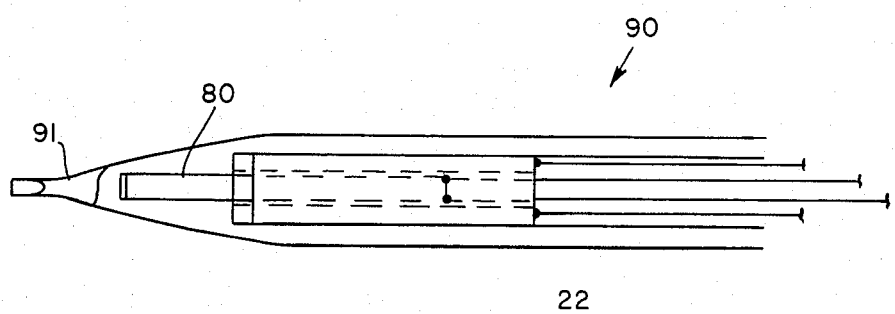

Thus, it will be understood that the heater 22 is not really part of the control, which only responds to resistance changes of the heater 80. It will also be understood that the heater 80 should be disposed in the close neighborhood of the soldering tip of a soldering instrument. This has been shown in FIG. 5, which illustrates the front portion 90 of a soldering instrument. Here the heater element 22 is illustrated with the heater element 80 being shown ahead of the heater 22. The tip 91 is also shown. Thus, the action of the circuit of FIG. 4 is that the temperature is controlled in accordance with that of the soldering tip 91; that is, in response to the temperature of the heater 80.

Also shown in FIG. 4 is a temperature sensor 92 which may be a thermocouple. This temperature sensor 92 may simply be connected between the resistors 39 and 42 of the voltage divider 39–45. It will thus change the reference voltage on input terminal 2 of amplifier 40 to obtain an anticipatory action. In this case, of course, the heater 80 is to be omitted.

Figure 6:
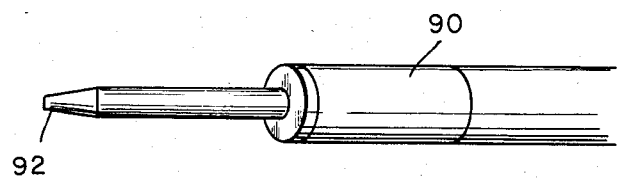

FIG. 6 shows such an arrangement with the front end 90 of a soldering instrument being provided with the temperature sensor 92 ahead of the heater 22 in the front end 90.

Figure 7:
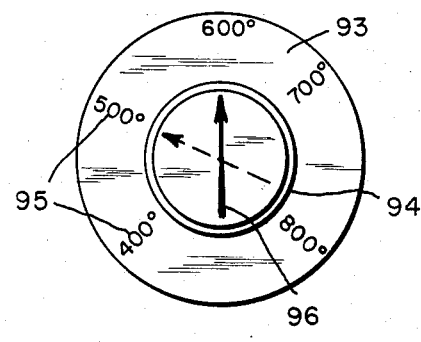
FIG. 7 illustrates schematically how a temperature indicator ring may be adjusted for the correct temperature by utilizing a separate temperature meter, the temperature ring surrounding the adjustment of a potentiometer for setting the temperature range.

FIG. 7 illustrates how the calibration of the instrument may be checked. Thus, there may be provided a fixed ring 93 surrounding an opening 94 through which the potentiometer 44 may be adjusted, as shown, for example, in one of the applicants' prior U.S. Pat. No. 3,883,716. The fixed ring 93 may be provided with temperature indications, say from 400° F. to 800° F. as shown at 95. The true temperature may be discovered by touching the soldering tip of the instrument to a separate temperature mater. This will show the true temperature of the tip and the knob or disk 96 may now be adjusted or rotated so that its arrow points to the temperature read on the meter.

It will be understood that such a calibration at one temprature point is sufficient for the entire range.

Figure 8:
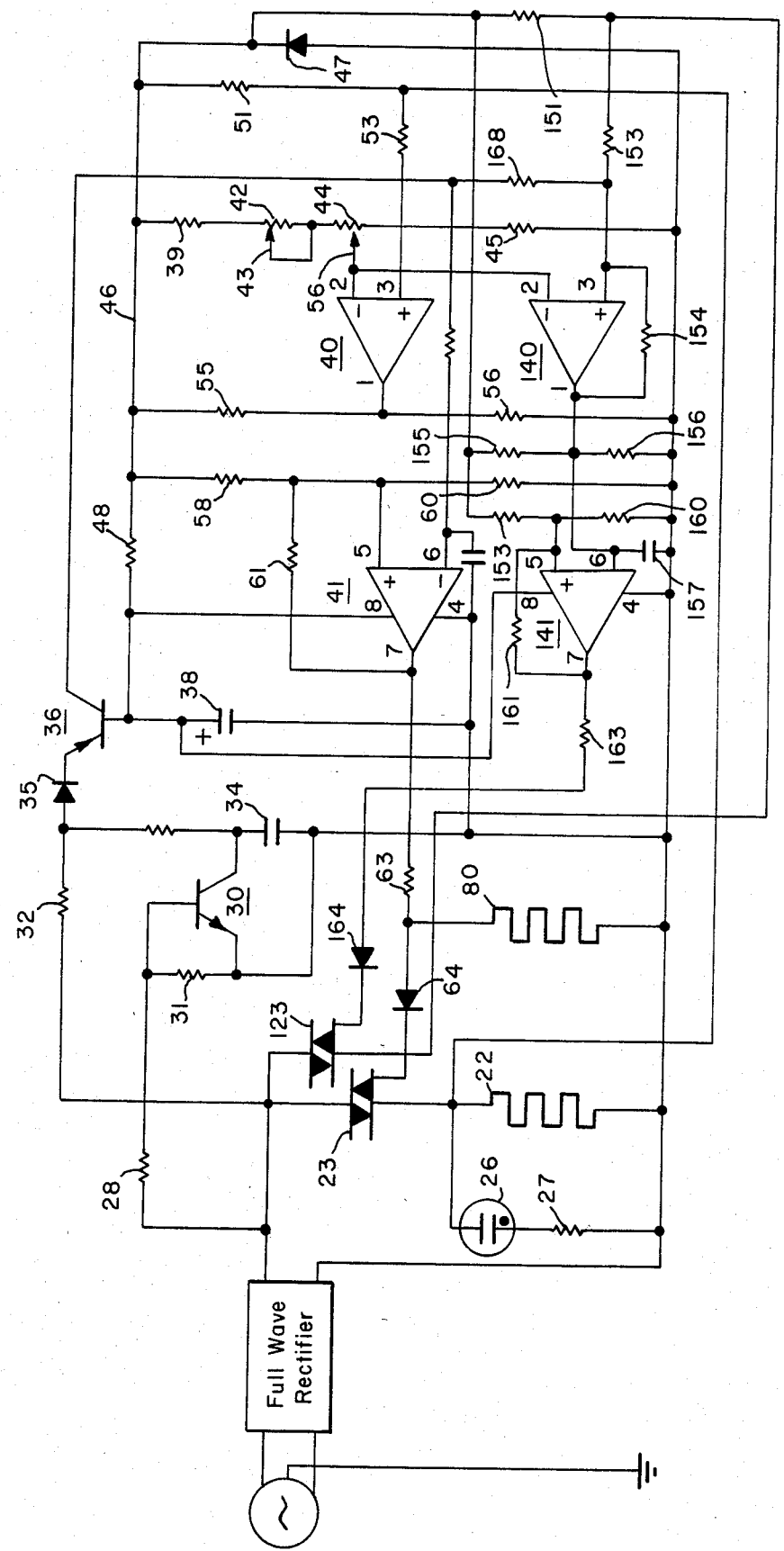
FIG. 8 illustrates yet another embodiment of the present invention, which is a circuit diagram of an embodiment utilizing two heater elements of different power capabilities, each having its separate amplifier section enabling an adjustment of the hysteresis of the summing amplifier.

It is also feasible to provide two separate heaters, each with an individual control circuit. Such an arrangement has been shown in FIG. 8, to which reference is now made. The difference of the circuit of FIG. 8 compared to that of FIG. 4 is that here each of the two heaters 22 and 80 has a separate set of amplifiers. That is, the heater 22 is controlled again by the amplifiers 40 and 41, as previously explained. However, the heater 80 is separately controlled by another set of amplifiers 140 and 141. In general, in FIG. 8 elements for controlling the heater 80 are designated by the same reference numerals used in FIG. 2 with the addition of 100 to the previous reference numbers. By means of the lead 52 the amplifier 40 is controlled by the resistance measurement of the heater 22. However, the amplifier 140 is controlled by a lead 152 and the current-limiting resistor 153 to the input 3 of the amplifier 140. Also, the same input is made responsive to the voltage on lead 46 through a current-limiting resistor 151 connected to resistor 153. Input terminal 2 of amplifier 140 is simply tied to input terminal 2 of amplifier 40.

However, the feedback resistor 154 of amplifier 140 will usually have a different valve from feedback resistor 54 of amplifier 40, for a purpose to be presently explained. Input terminal 5 of amplifier 141 is biased by resistors 158 and 160. A feedback resistor 161 is connected between the input terminal 5 and the output terminal 7. The time constant circuit connected to input terminal 6 of amplifier 141 is obtained by capacitor 157 and the two resistors 155 and 156 which also serve as a voltage divider. The output of amplifier 141 controls triac 123 through diode 164 and current-limiting resistor 163. A resistor 168 is connected between the collector of switching transistor 36 and the input 3 of the amplifier 140 for isolation purposes; that is, to isolate the input terminals 3 of the two amplifiers 40 and 140.

Otherwise the circuit of FIG. 8 operates like that of FIG. 2. It should be noted, however, that the feedback resistors 54 and 155 preferably have different values. This is in order to take care of the differences in the heat transfer between the heater 80 and the heater 22 and the tip of the soldering instrument and the remainder of the instrument. Also, the heater 22 with the lower current-carrying capacity, which is preferably located near or in the soldering tip, has its resistance connected to the amplifier 40 which has a larger feedback resistor 54 compared to the feedback resistor 154 of the amplifier 140. Hence the amplifier 40 has a shorter response time.

It should be noted that the heater 22 or the heater 80 may be embedded in a ceramic. The metal which actually constitutes the heater may be screen-printed on a substrate which may, for example, consist of alumina. The whole structure is then heated and sintered at high temperature to produce a monolithic heater structure. The temperature coefficient of resistance (TCR) is approximately $4.3 \times 10^{-3}$ ohms per ohms per degrees C. This value is true for a tungsten alloy, which is preferred because of its large temperature range and relatively large TCR. In this connection, reference is made to page 107 of the article previously referred to.

Figure 9:
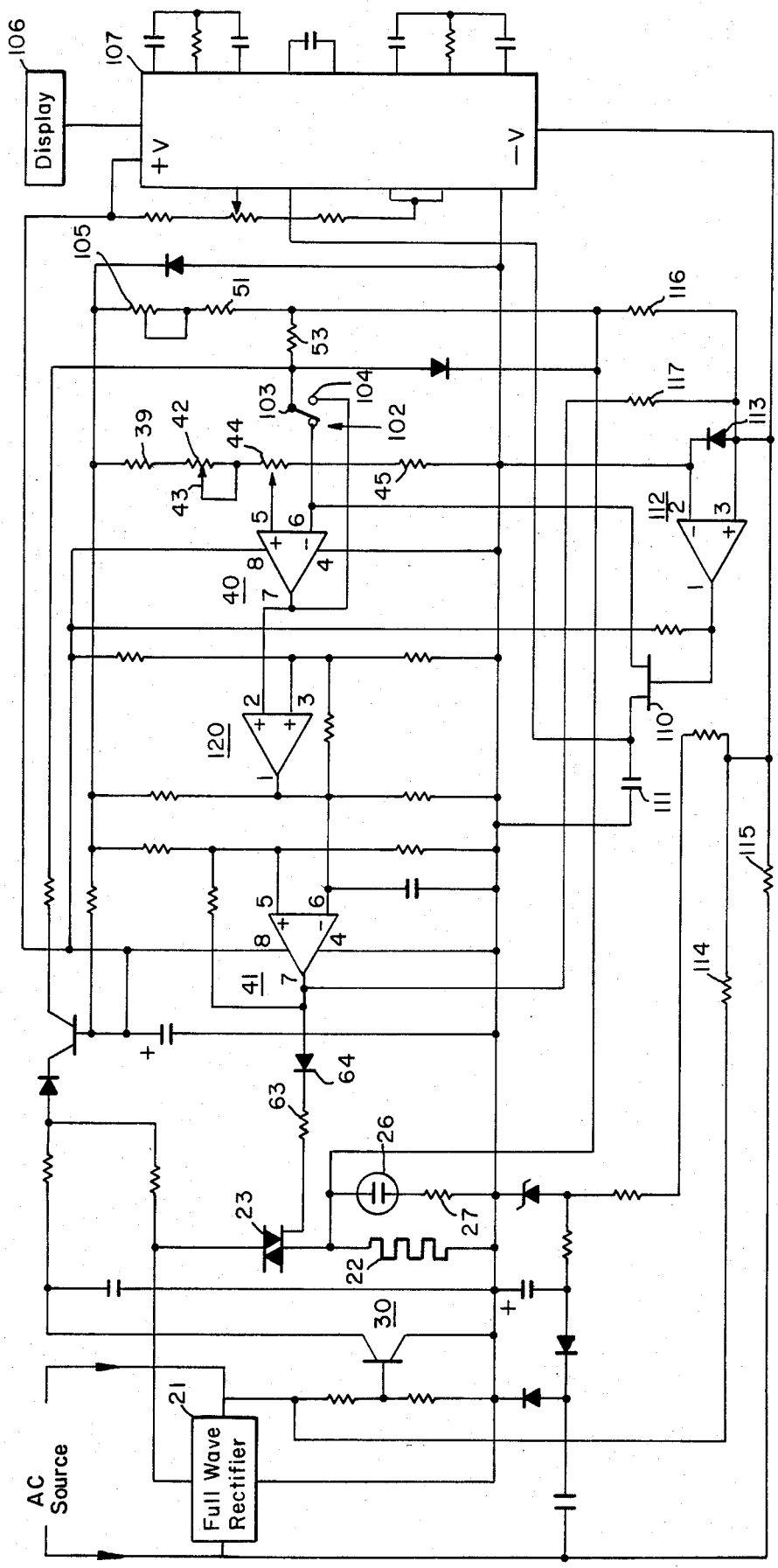
FIG. 9 is a circuit diagram generally corresponding to the circuit of FIG. 2 but providing a digital temperature display.

It is also feasible to provide any one of the electronic circuits of FIGS. 2, 4, and 8 with a digital readout to indicate the actual temperature of one or both of the heater elements. Such a circuit is illustrated in FIG. 9, to which reference is now made. The control circuit is basically the same as that of FIG. 2 and includes an operational amplifier 40 which, again, may be used as a summing amplifier. However, the amplifier 40 is not provided with a feedback path. The input terminal 5 of the amplifier 40 is provided with a bias voltage corresponding to the desired temperature, as previously explained. The other input 6 of the amplifier 40 is connected to a movable arm 101 of a switch 102 having two fixed terminals 103 and 104. Normally, the input terminal 6 is connected to the fixed terminal 103 of the switch. This, in turn, will impress a voltage corresponding to the temperature of the heater 22 onto the resistor 53.

It will be noted that the input terminals 5 and 6 have to be inverted compared to those of amplifier 40 in FIG. 2. The reason for this inversion is because when the switch arm 101 contacts the fixed terminal 104, the amplifier becomes a unity gain amplifier. In this connection it may be noted that if the electric component, the temperature of which is to be controlled, has a negative temperature coefficient rather than a positive temperature coefficient, the connections to the input of the amplifier 40 should also be reversed. It may also be noted that practically all metals have a positive temperature coefficient, while other materials, based on organic plastics, etc., usually have a negative temperature coefficient.

If the switch arm 101 contacts the fixed terminal 104, the potentiometer 44 sets the desired temperature on the display. On the other hand, when the switch arm contacts the terminal 103, the display 106 reads the heater temperature, which should eventually go to the set temperature. The display is controlled by a large scale integrated circuit 107 in the manner disclosed and claimed in prior applications to Robert C. Griffith and Wayne A. Murray, Ser. No. 223,679, filed July 16, 1981, and to Wayne A. Murray, Ser. No. 234,187, filed Mar. 30, 1981, both being assigned to the assignee of the present application.

The display input signal is derived from the terminal 93 and is the input signal to the input terminal 6 of amplifier 40. This signal is a voltage which represents the temperature of the heater 22. It is routed to a sample-and-hold transistor switch 100. In the present case this is a P-type FET transistor. Form there the signal goes to pin 31 of the unit 107, which is labelled "IN HIGH." The sample-and-hold circuit again includes a capacitor 111 directly connected to the transistor 110.

The sample-and-hold transistor 110 conducts only during zero voltage crossing of the input sine wave. This, of course, is the instant when the heater resistance is sampled. This sample voltage is stored in capacitor 111 and refreshed once at each one-half cycle of the sine wave. This is necessary because the display circuit requires a constant voltage to be displayed, even when the input sine wave is not at zero crossing.

The sample-and-hold circuit 110, 111 is, in turn, controlled from the amplifier 112. This amplifier acts as a summing and comparing amplifier. The input pin 2 of the amplifier 112 has a reference level which is connected to the low side of the negative side of the input circuit. This is a −5 v voltage derived from the terminal labelled "INT V−" of the unit 107 and is connected through a diode 113.

Any time the input terminal 3 of amplifier 112 is more positive than the input terminal 2, the comparator 112 turns on. This, in turn, turns off the sample transistor 110.

The summed input voltage impressed on the input terminal 3 of amplifier 112 is composed of five different voltages. One of these is the −5 v input voltage previously referred to. Two other inputs are impressed through resistors 114 and 115; that is, directly from the input sine wave. This would normally generate a positive input wave except at the instant when the sine wave is at the inflection point. The fourth input is obtained from one terminal of the heater element 22 and a resistor 116. This input voltage is positive as long as power is applied to the heater. The last input corresponds to the output of amplifier 41. This, of course, is the voltage applied to the triac 23 and applied to the input terminal 3 through a resistor 117. This input voltage is low except when the triac 23 is triggered with a positive pulse.

It should be noted that the amplifier 120 is a unity gain amplifier and is only provided in order to invert the output of the amplifier 40. The amplifier 41, again is the same amplifier that triggers the triac 23. It may also be noted that the triac 23 may be replaced by a silicon-controlled rectifier (SCR).

The four different inputs which are summed in the input terminal 3 of amplifier 112 will effect turning on the sample function of the sampling transistor 110 only during zero crossing of the sine wave. After the triac 23 turns off, a finite amount of settling time is required before the heater resistance may be measured and until its voltage becomes a steady signal.

Otherwise, the operation of the circuit of FIG. 9 will be obvious from the previous explanation of the circuit of FIG. 2. It should be noted that a display circuit of the type shown in FIG. 9 can readily be applied to the other FIGURES.

It will be understood that the circuit specifications of the electronic circuits of FIGS. 2, 4, 8 and 9 may vary according to the design for any particular application. The following circuit specifications are included by way of example only.

TABLE 1

| CIRCUIT OF FIG. 2 | | | |
|---|---|---|---|
| Resistor 28 | 1 megohm | Resistor 60 | 10K ohms |
| Resistor 31 | 10K ohms | Resistor 55 | 330K ohms |
| Resistor 27 | 68K ohms | Resistor 56 | 200K ohms |
| Resistor 63 | 510 ohms | Resistor 39 | 39K ohms |
| Resistor 32 | 27K ohms | Resistor 42 | 100K ohms |
| Resistor 33 | 100K ohms | Resistor 44 | 1K ohm |
| Resistor 61 | 200K ohms | Resistor 45 | 330 ohms |
| Resistor 48 | 2K ohms | Resistor 53 | 22K ohms |
| Resistor 58 | 51K ohms | Resistor 51 | 10K ohms |
| Resistor 54 | 4.7 megohms | Zener diode 47 | IN 756 |
| Capacitor 34 | .01 microfarad | Triac 23 | MAC 228-6 |
| Capacitor 57 | .15 microfarad | Heater element 22 | 68K |
| Capacitor 38 | 6.6 microfarad | Transistor 30 | 2N 2222 |
| Diode 64 | | Transistor 36 | 2N 2907 |
| Diode 35 | | Amplifiers 40 and 41 | each one-half LN 392 |

TABLE 2

| CIRCUIT OF FIG. 4 |
|---|
| All components are the same as those for FIG. 2, except as follows: |

| Heater element 80 | 20 watts |
|---|---|

TABLE 3

| CIRCUIT OF FIG. 8 |
|---|
| All components are the same as those for FIG. 2, except as follows: |

| Resistor 154 | 2 megohms |
|---|---|
| Amplifiers 140 and 141 | each one-half LN 392 |

TABLE 4

| CIRCUIT OF FIG. 9 |
|---|
| All components are the same as those for FIG. 2, except as follows: |

| Unit 107 | ICL-7136 |
|---|---|
| Transistor 110 | 7N 5460 |
| Capacitor 111 | .1 microfarad |
| Amplifiers 40 and 41 | each one-half LN 392 |
| Amplifiers 120 and 112 | each one-half LN 392 |

It will be understood that the control circuit of the present invention may find many different applications. For example, it may be feasible to use the circuit to control the speed of an electric motor. At zero load the reverse EMF may be sampled, or else the current the motor is drawing may be measured during zero load periods. In any case, the resistance of the motor winding may be measured during the inflection point of the input wave.

Similarly, the temperature of an electric range may be measured by measuring the resistance of the heater during no-load periods. This will result in an asymtotic control; that is, where the desired temperature is asymtotically reached. Also, for hot air soldering or desoldering, the heater resistance may be measured. Alternatively, a piezoelectric hot or cold device may be utilized to control either hot or cold temperatures.

Sometimes it is desired to control the temperature of a solder pot. When the solder pot becomes too hot, the solder oxidizes, or forms dross or foam, which is undesirable. The controlled temperature preferably is held at about 500° F., corresponding to 260° C. Also, an electric room heater may be controlled in the same manner.

In still other applications, even an industrial robot of the type which grips an object to be moved may be controlled. When the robot grips the object, it is feasible to measure the force required to close the claws. In this case the current or pressure may be sensed, which increases as the robot touches the object.

Concerning either an AC or DC motor, the motor torque can be controlled by sensing the current it draws. This may be accomplished either by measuring the resistance of the winding or by making the current flow through a resistor to measure the change of the resistance.

It is even feasible to utilize a Peltier device in lieu of a heater. Again, the temperature varies with the current flow therethrough. If the voltage is constant, the temperature difference has a positive temperature coefficient. For example, at 35° C. the unit may have a resistance of one ohm. The control circuit may also be used for controlling the temperature of a small oven to test integrated circuits or to provide a portable lab chamber for heating or cooling. It may even be used to control a refrigerator.

What is claimed is:

1. An electronic control circuit for controlling the power applied to an electric component, the resistance of which varies with the power flowing therethrough, said circuit comprising:
   (a) an alternating current source;
   (b) an electric component having a resistance varying with the power flowing therethrough;
   (c) full wave rectifier means having its input coupled across said source;
   (d) switch means for connecting said component across the output of said rectifier means in response to the resistance of said component deviating in a predetermined sense from a set resistance;
   (e) a switching transistor, having an emitter, and a diode connected in series with said emitter and said rectifier means
   (f) a first operational amplifier having a high gain and arranged as a comparator and summing amplifier, said first amplifier having a first and a second input;
   (g) a first voltage divider coupled across said rectifier means and having an intermediate tap connected to said first input;
   (h) said second input to said first amplifier being directly connected to the collector of said switching transistor;
   (i) a resistor connected to one terminal of said component and to said second input of said first amplifier to receive a current indicative of the resistance of said component when said switch means is open, and said second input being coupled to one arm of a bridge including said component and said first resistor and a positive feedback means from the output of said first amplifier to said second input, whereby said first amplifier has a low output when the voltage at said second input is less than the reference voltage at said first input;
   (j) a second operational amplifier having a relatively low gain and having a first and a second input, said second input being directly connected to the output of said first amplifier;
   (k) a second voltage divider connected across said rectifier means, said voltage divider being connected to said first input of said second amplifier;
   (l) a third voltage divider coupled across said rectifier means and having an intermediate point connected to the output of said first amplifier and to the second input of said second amplifier; and
   (m) a time constant circuit including a capacitor and said third voltage divider, said time constant circuit being connected to said second input of said second amplifier, whereby said second amplifier operates as a monostable multivibrator, the output of said second amplifier being connected to said switch means to permit conduction thereof upon occurrence of said zero voltage crossing signal for a period of time of a cycle of the input wave.

2. A control circuit as defined in claim 1 wherein said time constant circuit has a time constant which is larger than one-half cycle of the input wave and less than a full cycle of the input wave.

3. A control circuit as defined in claim 2 wherein said time constant circuit has a time constant of approximately 1.5 of a half cycle of the input wave.

4. A control circuit as defined in claim 1 wherein said electric component is a heater element.

5. A control circuit as defined in claim 1 wherein said switch means is a triac.

6. A control circuit as defined in claim 1 which further includes a sample-and-hold circuit connected to said source and having a first transistor, having an emitter and a collector, and capacitor connected across said rectifier means for sampling the positive going sine wave and for clamping said emitter of said first transistor and wherein said capacitor of said sample-and-hold circuit is connected between the emitter and collector of said first transistor and includes a further resistor connected between the collector of said first transistor and the anode of said diode.

7. A control circuit as defined in claim 4 which further includes a current-limiting resistor connected between said one terminal of said heater element and said second input of said first amplifier.

8. A control circuit as defined in claim 4 wherein a temperature sensor is provided, said sensor being disposed in the proximity of the object to be heated and ahead of said heater element, said sensor being connected in series with said first voltage divider connected to said first input of said first amplifier.

9. A control circuit as defined in claim 4 wherein a further heater element is provided, said first referred to heater element being designed for relatively low power and said further heater element being designed for substantially higher power, said first referred to heater element being disposed in the vicinity of the object to be heated and said further heater element being primarily intended for heating said object, said further heater element being connected through a further switch means across said source, whereby both of said switch means are actuated by the output of said second amplifier in response to the change of resistance of said first referred to heater element, thereby to provide an anticipatory action.

10. An electronic control circuit comprising:
(a) An alternating current source;
(b) A first and a second electric component, the resistance of each varying with the electric power flowing therethrough;
(c) Full wave rectifier means having its input coupled across said source;
(d) Switch means for separately connecting each of said components across said rectifier means, and connected to the output of said rectifier means and separately to each said component, in response to a signal responsive to the resistance of each of said components deviating in a predetermined sense from a set resistance;
(e) switching means coupled to said rectifier means for providing a zero crossing voltage signal;
(f) a first, second, third and fourth operational amplifier, each having a first and a second input and an output, said first amplifier having a high gain and being arranged as a voltage comparator and summing amplifier;
(g) a first voltage divider coupled across said rectifier means and having an intermediate tap connected to said first input of said first amplifier;
(h) said second input of said first amplifier being connected to said switching means to receive said zero crossing voltage signal, one terminal of said first component being coupled to said second input of said first amplifier, to receive a current indicative of the resistance of said first component when said switch means is open, and said second input of said first amplifier being coupled to one arm of a bridge including said first component and a first resistor, a first positive feedback means connected from said output to said second input thereof, whereby said first amplifier has a low output when the voltage at said second input deviates in a predetermined sense from the reference voltage at said first input;
(i) said first input of said second amplifier being directly connected to said first input of said first amplifier;
(j) said second input of said second amplifier being coupled to said switching means to receive said zero crossing voltage signal, one terminal of said second component being coupled to said second input of said second amplifier, to receive a current representative of the resistance of said second component when said switch means is open, and said second input of said second amplifier being coupled to one arm of a second bridge including said second component and a second resistor, a second positive feedback means between the output of said second amplifier and said second input thereof, said first and second feedback means having different resistances, whereby said second amplifier has a low output when the voltage of said second input deviates in a predetermined sense from the reference voltage at its first input;
(k) said second input of said third amplifier being connected to the output of said first amplifier;
(l) a second voltage divider connected across said rectifier means, and to said second input of said third amplifier;
(m) a third voltage divider connected across said rectifier means and to said second input of said fourth amplifier; and
(n) a first time constant circuit and a second time constant circuit, each being coupled respectively to said second input of said third amplifier and to said second input of said fourth amplifier, whereby said third and fourth amplifiers operate as monostable multivibrators, the output of said third amplifier being connected to the switch associated with said first component and the output of said fourth amplifier being connected to the switch associated with said second component, thereby to cause said first and second components to conduct independently from each other during a positive going sine wave and during an inflection point thereof.

11. A control circuit as defined in claim 10 wherein said first component has a relatively high resistance and said first positive feedback means has a relatively low resistance, and wherein said second component has a relatively high resistance while said second positive feedback means has a relatively low resistance, whereby said first amplifier has a faster response time to an input signal than said second amplifier.

12. An electronic control circuit for controlling the power applied to an electric heater element, the resistance of which varies with power flowing therethrough and including a digital readout of the thus measured temperature, said circuit comprising:
(a) an alternating current source;
(b) an electric heater having a resistance varying with the power flowing therethrough and with the temperature thereof;
(c) full wave rectifier means coupled across said source;
(d) switch means for connecting said heater element across said rectifier means in response to the resistance of said element deviating in a predetermined sense from a set resistance;
(e) means including a switching transistor and a diode coupled to said rectifier means and providing a zero crossing voltage signal;
(f) a capacitor for sampling positive going since waves and storing the results on said capacitor;
(g) a first, a second, a third, and a fourth operational amplifier, each having two input terminals and an output terminal;
(h) a first voltage divider coupled across said rectifier means and having an intermediate tap connected to the first input of said first amplifier;
(i) said second input of said first amplifier being connected to a two-pole switch having a first and a second terminal, said first terminal being connected to a second voltage divider coupled across said rectifier means, one terminal of said heater element being coupled through said first switch terminal to said second input of said first amplifier and the emitter of said first transistor being coupled thereto;
(j) the output of said first amplifier being directly connected to the first input of said second amplifier, serving as a unity gain amplifier and generating an inverse output on the output terminal thereof;
(k) a third voltage divider coupled across said rectifier means and having an intermediate point connected to the second input of said second amplifier;
(l) the third amplifier having its second input connected to the output of said second amplifier and having a capacitance resistance circuit connected thereto to provide a monostable multivibrator;

(m) a fourth voltage divider coupled across said rectifier means and connected to the first input of said third amplifier;

(n) the output of said third amplifier being coupled to said switch means for energizing said heater element;

(o) the first input of said fourth amplifier being coupled to said second voltage divider;

(p) the second input of said fourth amplifier being coupled to said alternating current voltage source and to said first voltage divider;

(q) a capacitor coupled to said second input of said first amplifier for storing a signal representative of the resistance of said heater element;

(r) a digital display and control means for exhibiting the temperature of said heater element and having an input coupled to said capacitor; and (s) the second terminal of said switch being connected to the second input of said first amplifier being connected to the output thereof, whereby said display exhibits the set temperature.

* * * * *